Oct. 21, 1952  W. SHAKESPEARE, JR  2,614,768
FISHING REEL
Filed March 4, 1949
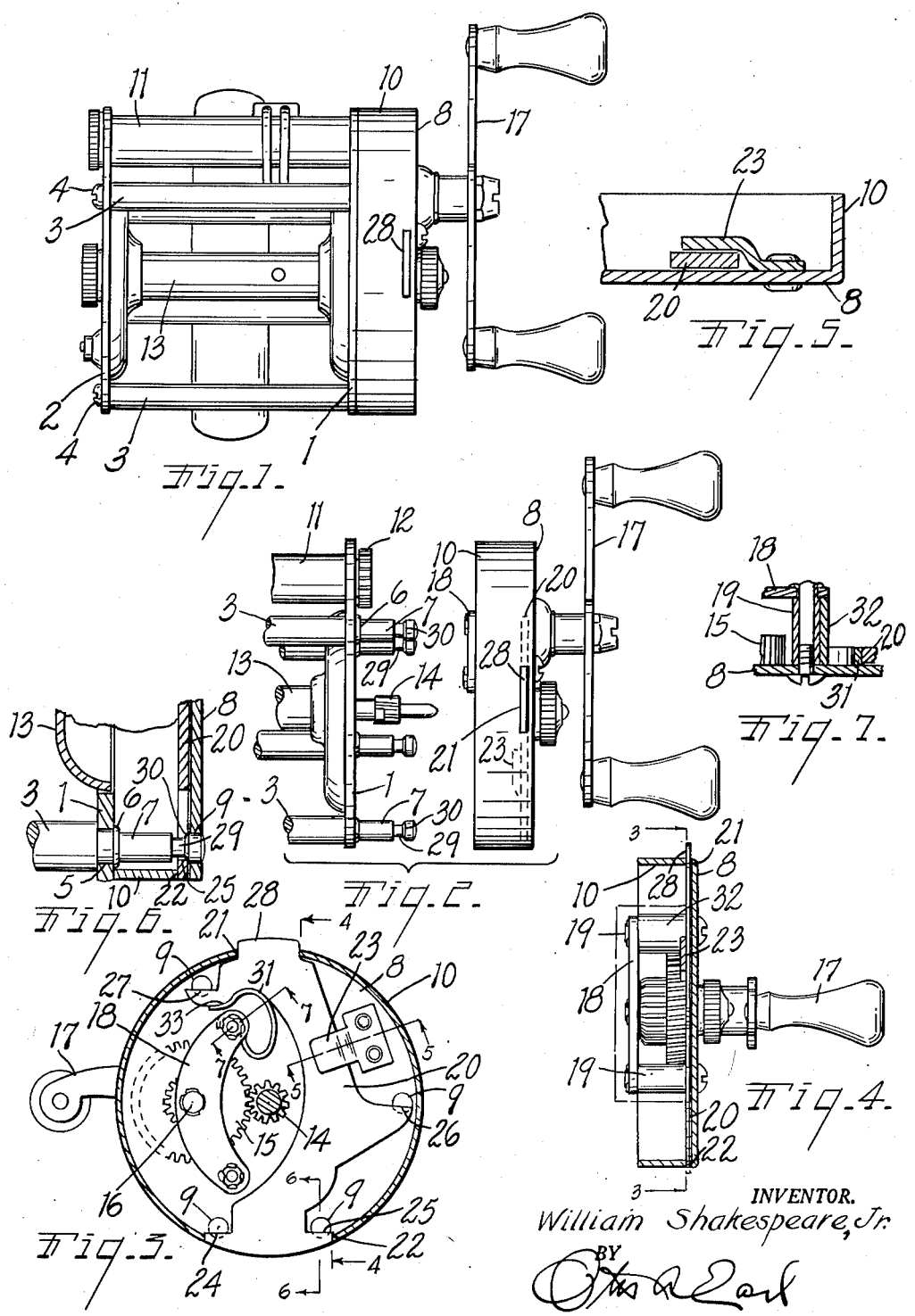
INVENTOR.
William Shakespeare, Jr.
BY
ATTORNEY.

Patented Oct. 21, 1952

2,614,768

UNITED STATES PATENT OFFICE 2,614,768

FISHING REEL

William Shakespeare, Jr., Kalamazoo, Mich., assignor to Shakespeare Company, Kalamazoo, Mich., a corporation of Michigan Application March 4, 1949, Serial No. 79,694

4 Claims. (Cl. 242—84.1)

This invention relates to improvements in fishing reels and particularly to the take-apart features thereof.

The main objects of this invention are:

First, to provide a fishing reel in which the chambered head member may be quickly disengaged or released from the frame to permit the cleaning and oiling of gears and bearing parts and quickly replaced without the use of tools.

Second, to provide a fishing reel having these advantages in which the parts are securely retained in assembled relation without looseness or rattling of parts.

Third, to provide a structure embodying these advantages in which a single catch member serves to secure the removable head member to a plurality of supporting posts.

Objects relating to details and economies of the invention will appear from the description to follow. The invention is defined and pointed out in the claims.

A preferred embodiment of the invention is illustrated in the accompanying drawing, in which:

Fig. 1 is a top view of a fishing reel embodying my invention.

Fig. 2 is a fragmentary exploded view showseveral parts of my invention in separated or disconnected relation.

Fig. 3 is a view taken on a line corresponding to line 3—3 of Fig. 4 showing structural details.

Fig. 4 is a fragmentary view partially in section on a line corresponding to line 4—4 of Fig. 3.

Fig. 5 is an enlarged fragmentary view in section on a line corresponding to line 5—5 of Fig. 3.

Fig. 6 is an enlarged fragmentary view partially in section on a line corresponding to line 6—6 of Fig. 3.

Fig. 7 is an enlarged fragmentary view on a line corresponding to line 7—7 of Fig. 3.

In the embodiment of my invention illustrated, the frame comprises the annular end plate 1, tail plate 2 connected by a plurality of pillars 3. These pillars are spaced about the frame in the conventional manner. They are secured to the tail plate by screws 4 tapped into the ends of the pillars. The pillars have reduced end portions disposed through openings 5 in the end plate 1 and secured thereto by upsetting or staking as indicated at 6. The ends of the pillars constitute supporting posts 7 for the head plate 8 which has holes 9 therein receiving the ends of the pillars.

The head plate is provided with a peripheral flange 10 providing a housing for the gearing and other parts. 11 designates the level wind mechanism but as this forms no part of my present invention it is not illustrated or described in detail herein. Its driven gear 12 is, however, enclosed by the flanged head plate coacting with the end plate 1. The spool 13 is provided with a pinion 14 driven from the gear 15 driven by the crank 17. The gear 15 is carried by the shaft 16 supported by the bridge piece 18 mounted on the posts 19.

To detachably secure the head plate to the supporting posts 7, I provide a catch member 20 which may be formed of a flat stamping and is disposed on the inner side of the head plate with its ends projecting through diametrically opposed slots 21 and 22 in the flange of the head plate.

The slots are of such width and length as to prevent substantial lateral movement of the catch plate therein. To further guide and slidably support the catch member, I provide a clip-like support 23 which overlaps a portion of the catch member in spaced relation to the rim. The catch member is provided with a plurality of catches or detents 24, 25, 26 and 27 all facing in the same direction and toward the finger piece end 28 of the catch member which is extended or is of such length that when the catches are engaged it projects from the periphery of the head plate so that it may be depressed to disengage the catches from the coacting keepers 29 formed on the ends of the posts 7. These keepers are preferably beveled as indicated at 30 to draw the flange of the head plate firmly against the outer side of the end member 1 of the frame.

To compensate for such combination of manufacturing tolerances as may sometimes arise in production on a large scale the catch member is slightly spaced from the head plate as shown in Figs. 4 and 6. This permits the bending of the catches in either direction sufficiently to insure the desired engagement.

The catch member is biased to engaged position by bowed spring 31 which has a post engaging lateral extension 32 best shown in Fig. 7. The outer or springable end of the spring 31 engages in a curved seat 33 formed on the edge of the catch member in opposition to the finger piece 28 so that the spring engages the catches and holds them in engaged position. The bowed spring is retained in position merely by snapping its seating end 32 over the supporting post and engaging the outer end of the spring in the seat 33 provided therefor on the catch member. With this arrangement there are relatively few parts and they may be quickly and easily assembled. The head plate is effectively secured and retained in position but may be easily detached for cleaning or oiling the reel, its detachment exposing or permitting the removal of the parts which are likely to require such attention.

I have illustrated and described my invention in a highly practical embodiment thereof. I have not attempted to illustrate or describe other embodiments or adaptations which I contemplate as it is believed that this disclosure will enable those skilled in the art to embody or adapt my invention as may be desired.

Having thus described my invention, what I claim as new and desire to secure by Letters Patent is:

1. In a fishing reel, the combination of an annular frame end member, pillars having end portions disposed through said end member and constituting head plate supporting posts, the frame member being fixedly secured to the pillars, a flanged head plate having holes therein receiving said posts, the head plate flange having oppositely disposed peripheral slots therein, the outer edges of the slots being slightly spaced inwardly from the plane of the inner side of said head plate, a catch member slidably mounted within said head plate with its ends within said slots, one end of said catch constituting a finger piece, a support mounted on the inner side of the head plate to overlap the catch member, said posts having recesses therein constituting keepers, said catch plate having a plurality of bendable catches all facing in the direction of the finger piece of said catch member and simultaneously engageable with said keepers, the keepers being cammed, said head plate having a spring supporting post thereon, and a bowed spring having a curved lateral extension at its inner end in supported engagement with said post, said catch member having an inwardly facing curved thrust seat coacting with the springable outer end of said spring.

2. In a fishing reel, the combination of an annular frame end member, pillars having end portions disposed through said end member and constituting head plate supporting posts, the frame member being fixedly secured to the pillars, a flanged head plate having holes therein receiving said posts, the head plate flange having oppositely disposed peripheral slots therein, a catch plate slidably mounted within said head plate and having its ends received in said slots, one of said ends constituting a finger piece projecting from the head plate flange, said posts having recesses therein constituting keepers, said catch plate having a plurality of catches all facing in the direction of the finger piece of said catch member and simultaneously engageable with said keepers, said head plate having a spring supporting post thereon, and a bowed spring having a curved lateral extension at its inner end in supported engagement with said post, said catch member having an inwardly facing curved thrust seat coacting with the springable outer end of said spring.

3. In a fishing reel, the combination of an annular frame end member, pillars having end portions disposed through said end member and constituting head plate supporting posts, the frame member being fixedly secured to the pillars, a flanged head plate having holes therein receiving said posts, the head plate flange having oppositely disposed peripheral slots therein, the outer edges of the slots being spaced from the plane of the inner side of the head plate, a catch plate disposed on the inner side of said head plate with its ends within said slots in slidably supported relation thereto and the inner side of the head plate, one of said ends constituting a finger piece projecting from the head plate flange, said posts having recesses therein constituting keepers, said catch plate having a plurality of bendable catches all facing in the direction of the finger piece of said catch plate and simultaneously engageable with said keepers, and a spring acting to bias said catch plate to catch engaging position.

4. In a fishing reel, the combination of an annular frame end member, pillars having end portions disposed through said end member and constituting head plate supporting posts, the frame member being fixedly secured to the pillars, a flanged head plate having holes therein receiving said posts, the head plate flange having oppositely disposed peripheral slots therein, a catch plate slidably mounted within said head plate and having its ends received in said slots, one of said ends constituting a finger piece projecting from the head plate flange, said posts having recesses therein constituting keepers, said catch plate having a plurality of catches all facing in the direction of the finger piece of said catch plate and simultaneously engageable with said keepers, and a spring acting to bias said catch plate to catch engaging position.

WILLIAM SHAKESPEARE, Jr.

REFERENCES CITED

The following references are of record in the file of this patent:

UNITED STATES PATENTS

| Number | Name | Date |
|---|---|---|
| 878,281 | Dom | Feb. 4, 1908 |
| 2,148,789 | Unger | Feb. 28, 1939 |
| 2,460,950 | Shakespeare, Jr. | Feb. 8, 1949 |